United States Patent
Rudy

[11] Patent Number: 6,127,010
[45] Date of Patent: *Oct. 3, 2000

[54] SHOCK ABSORBING CUSHION

[75] Inventor: Marion Franklin Rudy, Northridge, Calif.

[73] Assignee: Robert C. Bogert, Marina Del Rey, Calif.; a part interest

[*] Notice: This patent issued on a continued prosecution application filed under 37 CFR 1.53(d), and is subject to the twenty year patent term provisions of 35 U.S.C. 154(a)(2).

[21] Appl. No.: 09/062,847

[22] Filed: Apr. 20, 1998

Related U.S. Application Data

[62] Division of application No. 08/516,942, Aug. 18, 1995, Pat. No. 5,741,568.

[51] Int. Cl.$^7$ .............. A43B 13/18; A43B 13/20; A43B 21/26; A43B 21/32
[52] U.S. Cl. .............. 428/35.7; 428/69; 428/76; 36/28; 36/29; 36/35 B; 36/35 R; 36/37; 36/141
[58] Field of Search .............. 428/35.7, 69, 71, 428/72, 74, 76, 36.8; 36/28, 29, 141, 30 A, 35 B, 35 R, 37, 35 A; 5/706, 707, 708, 709, 712, 713, 448, 450, 451, 452, 453, 455

[56] References Cited

U.S. PATENT DOCUMENTS

| | | | |
|---|---|---|---|
| 2,626,886 | 1/1953 | Scholl | 154/103 |
| 3,044,075 | 7/1962 | Rawlings | 2/22 |
| 3,465,364 | 9/1969 | Edelson | 2/22 |
| 3,507,727 | 4/1970 | Marshack | 156/153 |
| 3,707,434 | 12/1972 | Stayner | 161/161 |
| 3,823,493 | 7/1974 | Brehm et al. | 36/25 R |
| 3,839,138 | 10/1974 | Kyle et al. | 161/159 |
| 3,900,650 | 8/1975 | Sedore | 428/86 |
| 3,914,881 | 10/1975 | Striegel | 36/44 |
| 3,927,139 | 12/1975 | Bozer et al. | 260/829 |
| 4,216,177 | 8/1980 | Otto | 264/25 |
| 4,242,406 | 12/1980 | Bouhnini et al. | 428/236 |
| 4,263,727 | 4/1981 | Bender et al. | 36/44 |
| 4,297,797 | 11/1981 | Meyers | 36/29 |
| 4,347,205 | 8/1982 | Stewart | 264/130 |
| 4,394,418 | 7/1983 | Temple | 428/391 |
| 4,464,428 | 8/1984 | Ebert et al. | 428/95 |
| 4,464,850 | 8/1984 | Ebert et al. | 36/44 |
| 4,471,538 | 9/1984 | Pomeranz et al. | 36/28 |
| 4,508,775 | 4/1985 | Adiletta | 428/240 |
| 4,513,449 | 4/1985 | Donzis | 2/2 |
| 4,663,226 | 5/1987 | Vajs et al. | 428/305.5 |
| 4,874,640 | 10/1989 | Donzis | 427/421 |
| 4,894,932 | 1/1990 | Harada et al. | 36/3 R |
| 4,906,502 | 3/1990 | Rudy | 428/69 |
| 5,083,361 | 1/1992 | Rudy | 29/454 |
| 5,228,217 | 7/1993 | Dabuzhsky et al. | 36/28 |
| 5,422,150 | 6/1995 | Scoular et al. | 428/33 |
| 5,493,792 | 2/1996 | Bates et al. | 36/28 |
| 5,501,891 | 3/1996 | Saika et al. | 428/71 |
| 5,564,202 | 10/1996 | Hoppenstein | 36/25 R |
| 5,713,141 | 2/1998 | Mitchell et al. | 36/27 |
| 5,727,336 | 3/1998 | Ogden | 36/43 |

*Primary Examiner*—Ellis Robinson
*Assistant Examiner*—John J. Figueroa
*Attorney, Agent, or Firm*—Fay, Sharpe, Fagan, Minnich & McKee, LLP

[57] ABSTRACT

A shock absorbing cushioning device suitable for products, objects and footwear which is comprised of a compressible insert encapsulated within an elastomeric barrier member. The elastomeric barrier member is secured to the compressible insert by a plurality of tensile members having a first portion embedded in the elastomeric material and a second portion embedded in the compressible insert. The elastomeric member is also filled with a fluid, preferably a compressible gas.

17 Claims, 6 Drawing Sheets

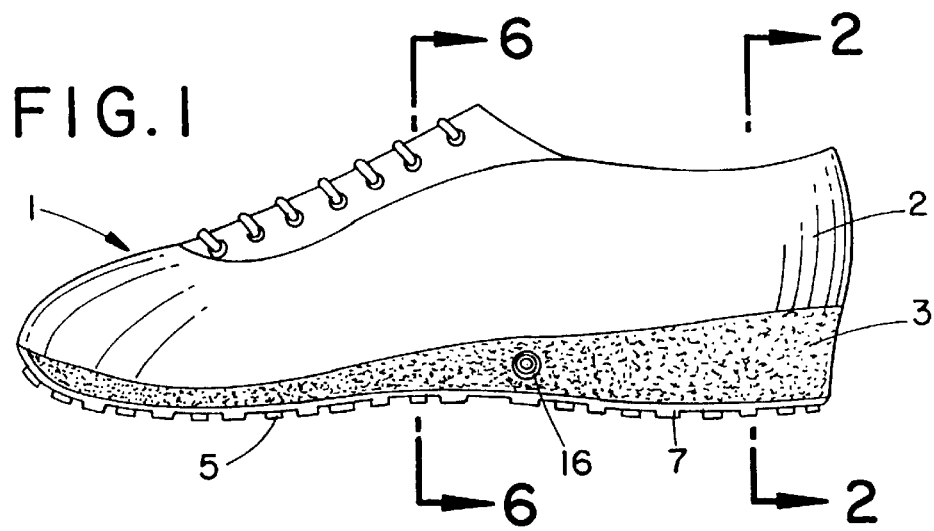
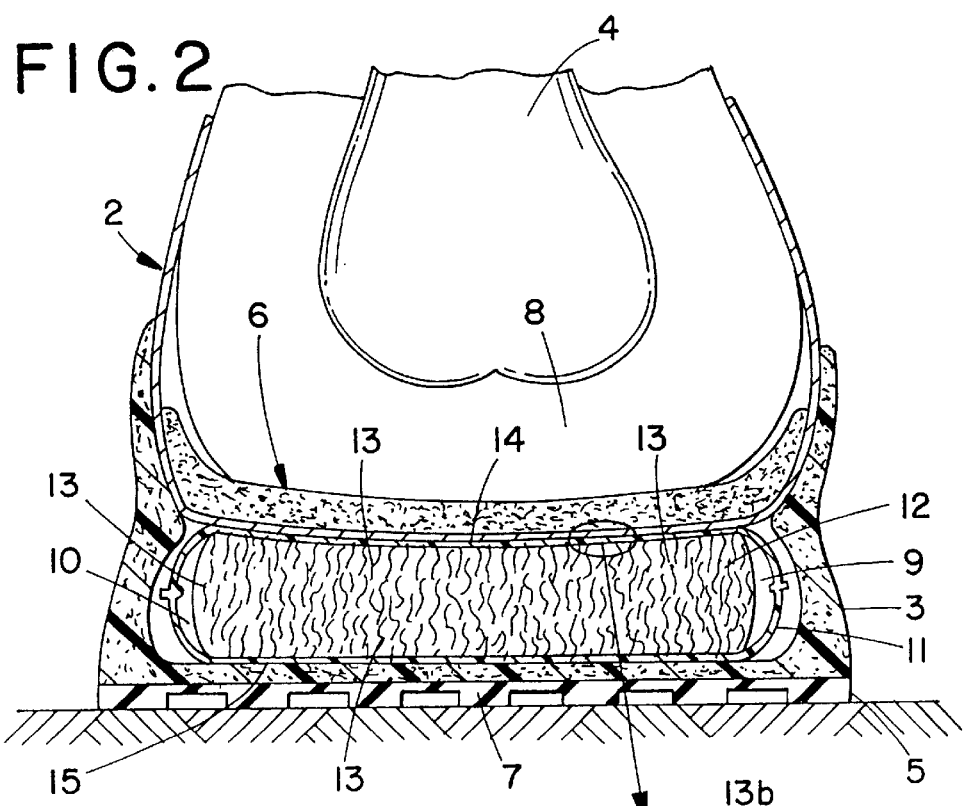
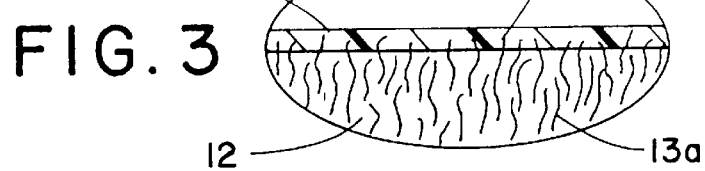

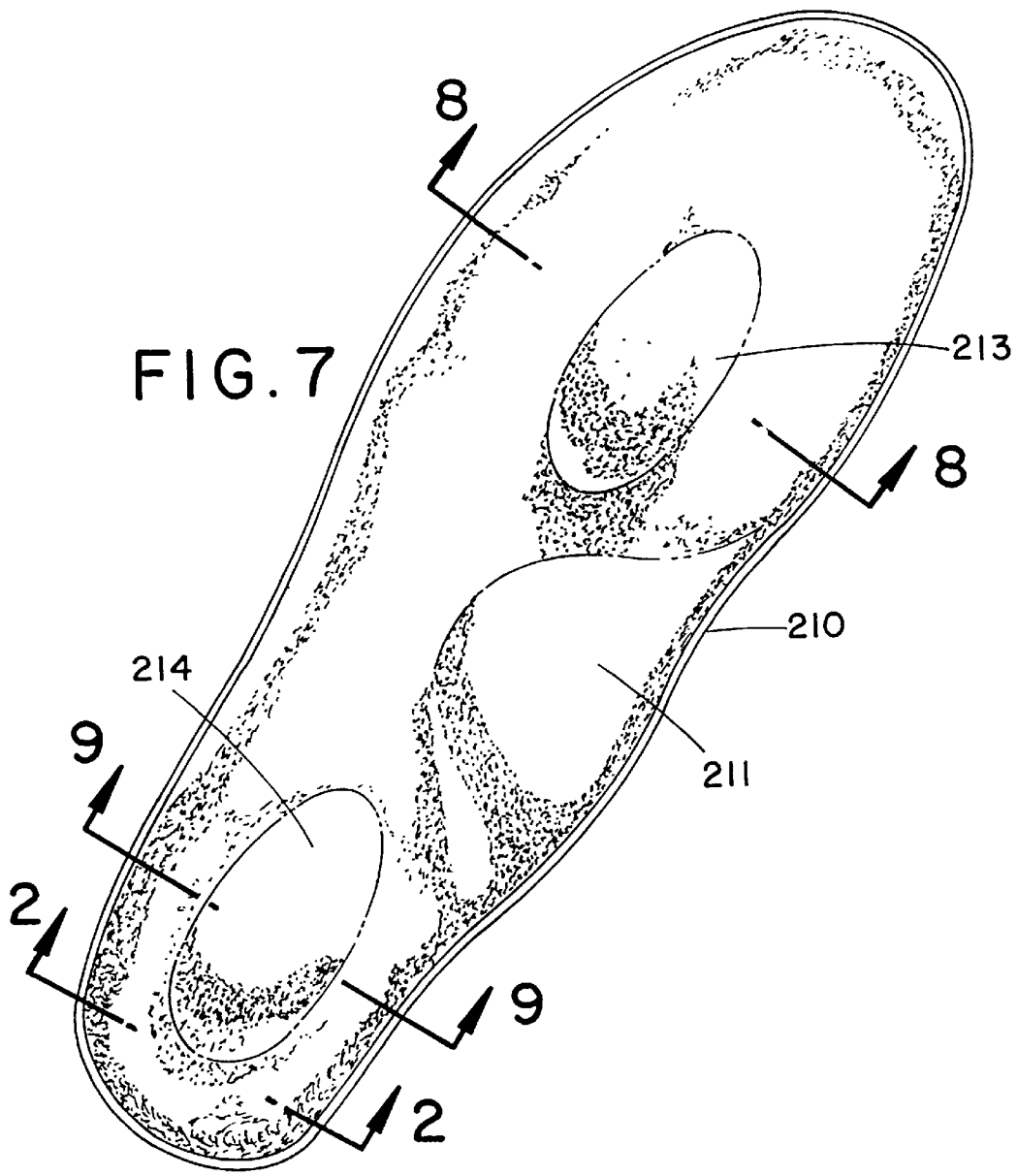

SHOCK ABSORBING CUSHION

This is a divisional of application Ser. No. 08/516,942, filed Aug. 18, 1995 now U.S. Pat. No. 5,741,568, issued Apr. 21, 1998.

BACKGROUND OF THE INVENTION

This invention relates to a shock absorbing cushion for athletic and industrial gear and footwear. More particularly, this invention relates to a shock absorbing cushion comprised of a sealed elastomeric envelope enclosing a compressible material and a fluid, wherein the compressible material is secured to the elastomeric envelope by a plurality of filaments, or a plurality of tensile elements forming the inner surface of said envelope material, and securely imbedded in said compressible material so as to substantially impede delamination between said envelope and said compressible material.

The cushion is particularly well suited to absorb the impact experienced in athletic endeavors and effectively return energy to the athlete. More particularly, the cushion is well suited to the intense and repetitious impact which occurs in short intervals during athletic activities. Throughout the specification, numerous references will be made to use of the cushion as a portion of the sole of athletic footwear; however, it should be realized that the inventive cushion can be beneficially incorporated into various types of footwear including, but not limited to, dress shoes, boots, sandals, etc. In addition, the new cushioning device can provide protection in many types of athletic equipment where these unique cushioning and dynamic characteristics would be beneficial such as football, soccer, baseball, knee, leg, shoulder, neck and arm pads, saddles, helmets, gloves, seat cushions, etc.

A great many shock absorbing devices exist in the footwear art to absorb the shock of foot strike. One common approach to impact absorption has involved using blocks of a compressible padding material. For example, shoes have been constructed with cotton padding, horsehair padding, rubber, plastic foam, and the like. In these shoes, the inherent resilience of the compressible padding material is used to absorb and disperse impact. However, these materials are relatively inefficient in their ability to return energy to the shoe wearer and after repeated use become compacted and lose their cushioning properties. Furthermore, on severe impacts, unless a relatively thick block of compressible padding is used, these designs experience full compression or "bottom out" quickly which results in severe impact stress on the wearer's body. When made thicker to avoid this problem, the compressible padding material becomes cumbersome and heavy and can interfere with the design of the footwear and in an athlete's performance. In addition, when the padding material is thick, instability may be encountered.

Within the grouping of cushions constructed of compressible padding materials, foam inserts are preferred in athletic footwear because of their light weight and relatively favorable cushioning characteristics. Notwithstanding the superiority of foam within the compressible padding material group, it has been found that the cellular structure of a foam insert degrades with time and cyclic loading, resulting in collapse of the cell walls, and the corresponding rapid reduction in the cushioning characteristics of the insert. On the other hand, as opposed to the fluid inserts discussed below, foam and other compressible materials are not subject to instantaneous failure.

To improve the characteristics of footwear cushions comprised of compressible padding materials, shock absorbing devices have been developed which are based on the properties of fluids. Usually, these cushioning devices are comprised of a fluid encased within an elastomeric material. In the case of compressible fluids (ex. gasses), these devices rely primarily upon the compression of the enclosed fluid to provide the desired shock absorbance. In the case of incompressible fluids, cushioning is provided primarily by the flow of the fluid and/or the expansion and contraction of chamber walls housing the fluid. In addition, there are devices based on the combination of compressible and incompressible fluids.

It is believed that fluid filled cushioning inserts provide superior overall cushioning and performance characteristics as compared to cushions constructed of foam and other compressible padding materials. Particularly, energy return is generally believed to be more efficient in fluid filled devices, and there is likely to be an increase in the longevity of the device. Moreover, the cushioning activity of fluids does not degrade with time. Only when the elastomeric material containing the fluid experiences structural failure or puncture does the device cease to perform at a high level. Accordingly, it is essential in compressible and incompressible fluid containing cushions to provide a long-lived elastomeric encasement. However, two competing design factors complicate this endeavor.

First, a device having exceptional longevity can be achieved with a thick, strong, and durable elastomeric envelope. However, a thick envelope mitigates the benefits of fluid cushioning because the characteristics of the fluid are replaced and masked by those of the elastomeric material. Accordingly, it is desirable to have a thin walled envelope to obtain the maximum benefits of fluid cushioning. Unfortunately, a thin, flexible envelope may have too short of a lifespan before rupture.

Second, the competing interests of intrusive versus unobtrusive envelopes arises when a particular shaped cushion is desired. Moreover, fluids do not have an inherent shape. Therefore, the elastomeric material must assert shaping forces on the fluid. Obviously, a thick, strong elastomeric envelope can easily form complex shapes; however, the characteristics of the fluid medium are sacrificed. Of course, to highlight the desirable attributes of the fluid, the elastomeric member can be made thin and flexible; however, control of fluid flow and/or compression are all sacrificed.

As indicated above, considerable difficulty has been experienced in providing shaped, fluid filled cushions, particularly pressurized cushions, with a flat or smoothly contoured surface. One very successful solution to this dilemma is provided in U.S. Pat. No. 4,219,945 wherein a multichambered pressurized gas-filled elastomeric envelope is encapsulated in a visco-elastic foam. In this invention, the foam acts as a medium between a foot and the cushion and provides a smooth intermediate surface. Moreover, a cushion is formed of rounded tubular chambers of a thin and unobtrusive elastomeric material to provide exceptional fluid support. The cushion is then encapsulated in foam to fill the peaks and valleys and provide a specifically shaped cushion with a long life.

Notwithstanding the success of foam encapsulated gas-filled cushions, a desire persists to provide advancements thereon. In this regard, efforts have been made to provide a footwear cushioning device which provides the superior shock absorbing performance of fluids in combination with the complex shape and anatomic support obtainable via pad-type cushions. U.S. Pat. Nos. 4,874,640 and 5,083,361 are relevant endeavors into this type of cushioning device.

U.S. Pat. No. 4,874,640 describes a composite cushion comprised of a flexible plastic enclosure forming an internal cavity. The enclosure is generally impermeable to air and generally filled with a fluid that can be pressurized. The composite also includes a compression, impact absorbing foam core glued or bonded on its external surfaces to the internal surface of the plastic enclosure. The patent also suggests reinforcing the internal foam cushioning member by including filaments, fibers or fabrics to the integrating matrix of the foam core. Although initial cushioning is achieved with this design, it is believed that rapid delamination between either the reinforced or non-reinforced foam core and the external flexible plastic material can occur. This delimitation is a possible cause of an aneurism and/or instability.

U.S. Pat. No. 5,083,361 describes a pressurized gas inflated hermetically sealed barrier securely bonded on its inner surface to a double walled fabric structure. The double walled fabric structure is comprised of a first and second outer fabric layer spaced apart in a facing relationship yet interconnected with drop threads. The drop threads function essentially as tension members to position the opposing gas barrier surfaces in a precise geometric relationship from one to the other. In general, the interconnected fabric layers are connected to distal interior surfaces of the elastomeric material via a coupling material which penetrates and bonds to the fabric layers. This device has found significant commercial success. However, this device is relatively complex and expensive to manufacture. In addition, it should be noted that this device is inoperable as a cushion subsequent to a rupture or leak in the elastomeric barrier member.

Accordingly, the art is in need of a relatively inexpensive, long-lived, easy to manufacture, fluid containing cushioning device with controlled shape and cushioning characteristics. A particularly attractive means of achieving this end is the effective combination of fluid filled cushioning characteristics with the stability and reliability of compressible padding materials.

SUMMARY OF THE INVENTION

Accordingly, it is a primary object of this invention to provide a new and improved shock absorbing cushion for athletic and industrial gear and footwear.

It is an advantage of this invention to provide a new and improved cushion which combines the properties of fluids and compressible padding materials in a manner which achieves long term function.

A particularly significant advantage of a shock absorbing cushion having a fluid containing portion and an internally positioned compressible padding material is its superior shock absorbance and energy return in combination with an ability to be constructed in complicated shapes and provide cushioned support when the applied loads would otherwise bottom-out, especially in the event of fluid loss.

Additional objects and advantages of the invention will be set forth in part in the description which follows and in part will be obvious from the description, or may be learned by practice of the invention. The objects and advantages of the invention may be realized and attained by means of the combinations and permutations as particularly pointed out in the appended claims.

To achieve the foregoing objects in accordance with the purpose of the invention, as embodied and broadly described herein, the shock absorbing cushion of this invention comprises a flexible barrier envelope defining at least one sealed chamber containing a compressible material and a fluid.

The compressible material is secured to the barrier envelope by means of filaments having a first portion embedded in the compressible material and a second portion embedded in the internal face of the flexible barrier envelope. The term filaments is utilized throughout this specification; however, this term is intended to encompass fibrils, threads, strands, whiskers, woven and nonwoven fabrics, fibers and all equivalents thereof.

In a preferred embodiment, the compressible material will be comprised of foam and the fluid of a compressible gas or vapor. Preferably, the foam material includes at least partially open cells, more preferably a urethane foam.

In a particularly preferred embodiment, the compressible material will be a composite body wherein a plurality of overlapping, reinforcing fibers, filaments, or threads are uniformly disbursed in a properly oriented manner, and securely imbedded within (in situ) a matrix of an appropriate elastomeric foam material. Thusly, unique tensile and shear load carrying properties are added to a compressible material that is otherwise inherently weak and unsuited to supporting peel, tensile and shear loads. In this embodiment, the reinforcing filaments, alone or in combination with other filaments, can also act as the interconnecting members between the compressible flexible member and barrier envelope. Particularly, the reinforcing filaments can extend from the surface of the foam member and be embedded in the flexible barrier envelope or visa versa. A surface abrasion technique can be used to expose and free ends of the imbedded tensile elements from the surface layer of the compressible member so they may be imbedded and secured into the flexible barrier member.

As will be apparent to those skilled in the art, a great variety of methods are available to achieve a filament interconnection between the compressible material and the barrier envelope. For example, the filaments—as a chopped roving or as a fabric (woven or nonwoven)—can be embedded in the outer surface of the compressible insert and in the inner surface of the elastomeric barrier envelope.

Alternatively, the barrier envelope may include a plurality of small diameter contiguous, high strength elastomeric teat-like extensions or ridges protruding from its inner surface. These protrusions will extend into the filament reinforced compressible material and be securely bonded into the material. The protrusions are then embedded into the flexible barrier envelope to form a secure fatigue resistant engagement between the compressible member and flexible barrier envelope.

As an additional design alternative, when a filament-based padding forms at least a portion of the compressible material (e.g. cotton), the filaments which comprise the padding can be embedded into the barrier envelope.

DESCRIPTION OF THE DRAWINGS

The invention consists of the novel parts, constructions, arrangements, combinations, and improvements shown and described. The accompanying drawings, which are incorporated in and constitute a part of the specification, illustrate one embodiment of the invention and, together with the description, serve to explain the principles of the invention.

Of the drawings:

FIG. 1 is a perspective view of a shoe incorporating a shock absorbing cushion constructed in accordance with the teachings of this invention;

FIG. 2 is a sectional view taken along line 2—2 of FIG. 1;

FIG. 3 is an exploded view of a section of FIG. 2 showing details of the invention;

FIG. 7 is a perspective topographic view of the cushion of FIGS. 1, 2, 3, and 6;

DETAILED DESCRIPTION OF THE INVENTION

Figure 4A:
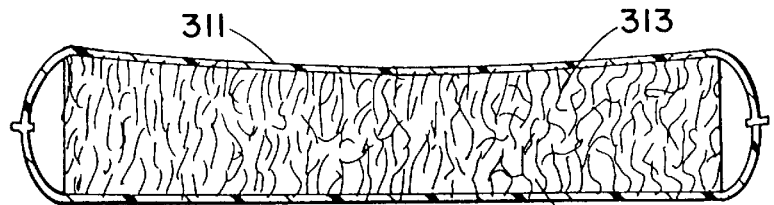
FIGS. 4A–4F are schematics of the shock absorbing cushion in a variety of compression modes.
Figure 4B:
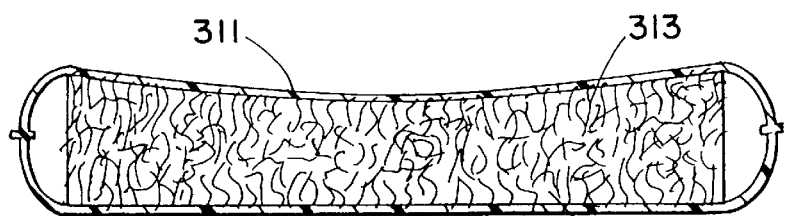
Figure 4C:
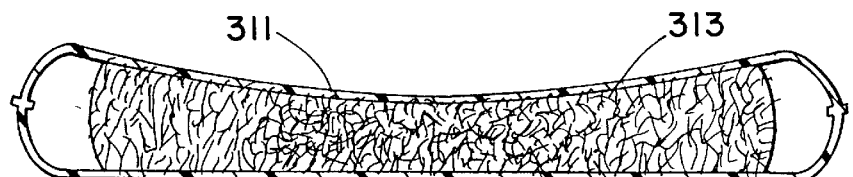
Figure 4D:
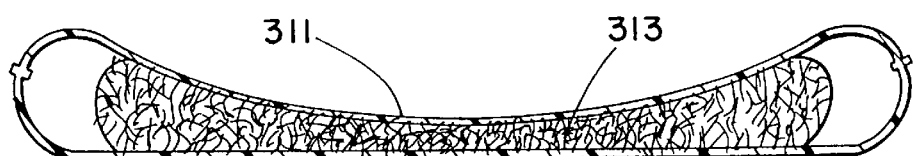
Figure 4E:
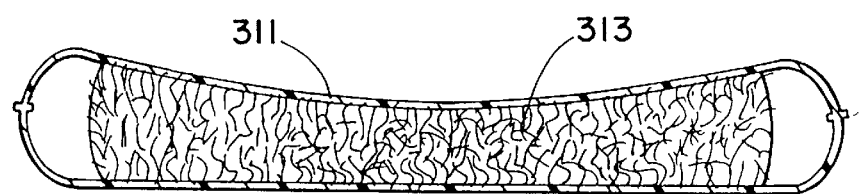
Figure 4F:
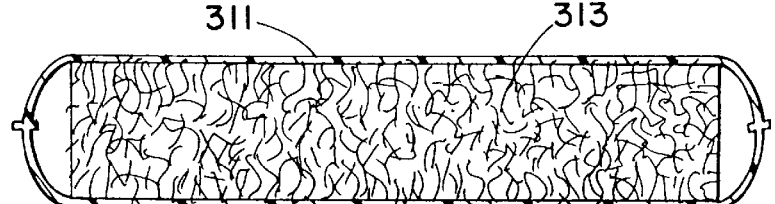

Reference will now be made in detail to the present preferred embodiment of the invention, examples of which are illustrated in the accompanying drawings.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined by the appended claims.

Referring now to FIGS. 1 and 2, shoe 1 is comprised of an upper 2 constructed of leather, vinyl, nylon, or any other fabric or material utilized in the art, secured to a mid-sole 3. Mid-sole 3 is secured to an out-sole 5 having studs or other ground engaging elements 7 for traction purposes. Of course, mid-sole 3 and out-sole 5 can be formed as a single element if desired. The shock absorbing cushion of the subject invention is contained in mid-sole 3, within chamber 9.

Referring particularly to FIG. 2, it can be seen that the heel portion of the foot, comprised of calcaneus 4 and fat pad 8, rest on sock liner 6 within upper 2. Underlying the foot, within chamber 9 of mid-sole 3, is inventive shock absorbing cushion 10. Cushion 10 is comprised of an elastomeric barrier material 11 hermetically sealed to enclose a fluid (not shown). Also enclosed within barrier material 11 with the fluid is compressible insert 12. Compressible insert 12 may be reinforced with embedded filaments 13 which also secure the barrier material 11 to compressible insert 12. As best seen in the enlarged view FIG. 3, filaments 13 have a first portion 13a embedded in compressible insert 12 and a second portion 13b embedded in barrier material 11.

Contemplated within the scope of this invention are shock absorbing cushions filled with one or more compressible fluids. A preferred fluid is a gas comprised of inert non-polar large molecules, alone or in combination with air. These devices can be self-inflating via diffusion pumping or mechanically inflated by means of a pump or pressure source in combination with a suitable valving arrangement. For example, midsole 3 can optionally be provided with valve(s) 16, in sealed communication with the shock absorbing cushion 10.

Gasses which have been found particularly suitable include the following: hexafluoroethane; sulfur hexafluoride; perfluoropropane; perfluorobutane; perfluoropentane; perfluorohexane; perfluoroheptane; octafluorocylcobutane; perfluorocyclobutane; hexafluoropropylene; tetrafluoromethane; monochloropentafluoroethane; 1,2-dichlorotetrafluoroethane; 1,1,2-trichloro-1,2,2-trifluoroethane; chlorotrifluoroethylene; bromotrifluoromethane; and, monochlorotrifluoromethane. Two preferred gasses within this group for use in the members are hexafluoroethane and sulfurhexafluoride in combination with nitrogen. These gases are identified in U.S. Pat. Nos. 4,340,626; 4,936,029; and 5,042,176 as "captive" gases which in combination with gases normally in the atmosphere surrounding the device that diffuse through the semi-permeable barrier film, i.e. "mobile" gases, pressurize the unit.

Also considered as suitable fluids with which to fill the barrier material are incompressible fluids such as water, semi-gel liquids, oils, grease, soft or liquid wax, glycerine, soft soap, silicones, rheopexic fluids, thixotropic fluids, and corn syrups which exemplify but do not limit the types of acceptable incompressible liquids. A preferred incompressible liquid has a viscosity between 50 and 3000 centistokes, is non-toxic, is odorless, and is resistant to freezing at temperatures to which footwear is typically exposed.

The flexible barrier member is preferably comprised of elastomeric materials selected from: polyurethane, polyester elastomer, fluoroelastomer, chlorinated polyethylene, polyvinyl chloride, chlorosulfonated polyethylene, polyethylene/ ethylene vinyl acetate copolymer, neoprene, butadiene acrylonitrile rubber, butadiene styrene rubber, ethylene propylene polymer, natural rubber, high strength silicone rubber, low density polyethylene, adduct rubber, sulfide rubber, methyl rubber, vulcanizable rubber, polyvinyl alcohol and thermoplastic rubber. Polyurethane is a particularly preferred material for construction of the barrier. The barrier material may also be comprised of crystallographic diffusion controlling materials as defined in U.S. Pat. Nos. 4,936,029 and 5,042,176.

Compressible insert 12 may be comprised of any padding material used in the cushioning and footwear art which provides support to both compressive and tensile forces, such as cotton, rubber, foam, horsehair, plastic mesh, etc. Preferably the compressible member is comprised of an at least partially open cell, flexible foam. Polyurethane or ethylene-vinyl acetate foams are preferred. However, any flexible, elastomeric foam common to those skilled in the cushioning and footwear art is suitable.

The cushioning devices, in particular, the fluid filling, flexible barrier materials and general cushion design (i.e. shape, number of chambers, position in a shoe, etc.) may be guided by the teachings in U.S. Pat. Nos. 3,005,272; 3,685, 176; 3,760,056; 4,183,156; 4,217,705; 4,219,945; 4,271, 706; 4,287,250; 4,297,797; 4,340,626; 4,370,754; 4,471, 538; 4,486,901; 4,506,460; 4,724,627; 4,779,359; 4,817, 304; 4,829,682; 4,864,737; 4,864,738; 4,874,640; 4,906, 502; 4,936,029; 5,036,603; 5,042,176; 5,083,361; 5,097, 607; 5,155,927; 5,228,217; 5,235,715; 5,245,766; 5,283, 963; 5,315,769; and 5,422,185 each of which is herein incorporated by reference.

As described in these patents, the cushion of the subject invention can form a component of a footwear product in the heel portion, the metatarsal region, the arch of the foot region, any combination of these, or any location in which foot and/or other body part cushioning is desired by one skilled in the art.

The preferred filament material joining the flexible barrier material 11 to compressible member 12 is comprised of polyesters, polyethylene terephthalate, polyamides, nylons, kevlar fiberglass, carbon, glass, silk, cotton, wool, urethane, aramide, dacron, cellulose, rayon, copra, acetate, polyvinyl alcohol, polyacrylics, and mixtures thereof. Of course, any sufficiently strong material which is compatible with the compressible insert and the barrier material is acceptable for use in forming the filaments.

In addition, even materials which are not compatible can be treated with a sizing compound or coupling agent to improve compatibility. Furthermore, as indicated above, the joining material is not limited to filament-like compounds. For example, it is envisioned that the "filaments" can be a fabric texturized to have tendrils, fibers or even loops extending from both facing surfaces thereof. Included within fabrics are woven and nonwoven mats having fibers, tendrils, etc. extending from the surface.

Preferably, the discrete filaments have a denier per filament of between about 1 and 20 and a length sufficient to allow a first portion to embed in the flexible barrier material and a second portion to embed in the compressible insert. In particular, a preferred fiber reinforced interface will exhibit sufficient tensile strength to provide a separation or peel strength between the barrier layer and compressible insert of at least 5 lb's per linear inch. A preferred embodiment would have a peel strength of at least 13 lbs. per linear inch.

The construction of a product or device utilizing the inventive cushion is particularly facilitated by the ability of the cushion to be constructed with custom shaped or contoured surfaces. For example, the cross-section of the foam insert in FIG. 2 demonstrates relatively flat top 14 and bottom 15 surfaces. However, and as demonstrated in FIGS. 6 through 9, the foam insert and the corresponding elastomeric flexible barrier material applied thereto can be formed with a contoured surface.

Figure 6:
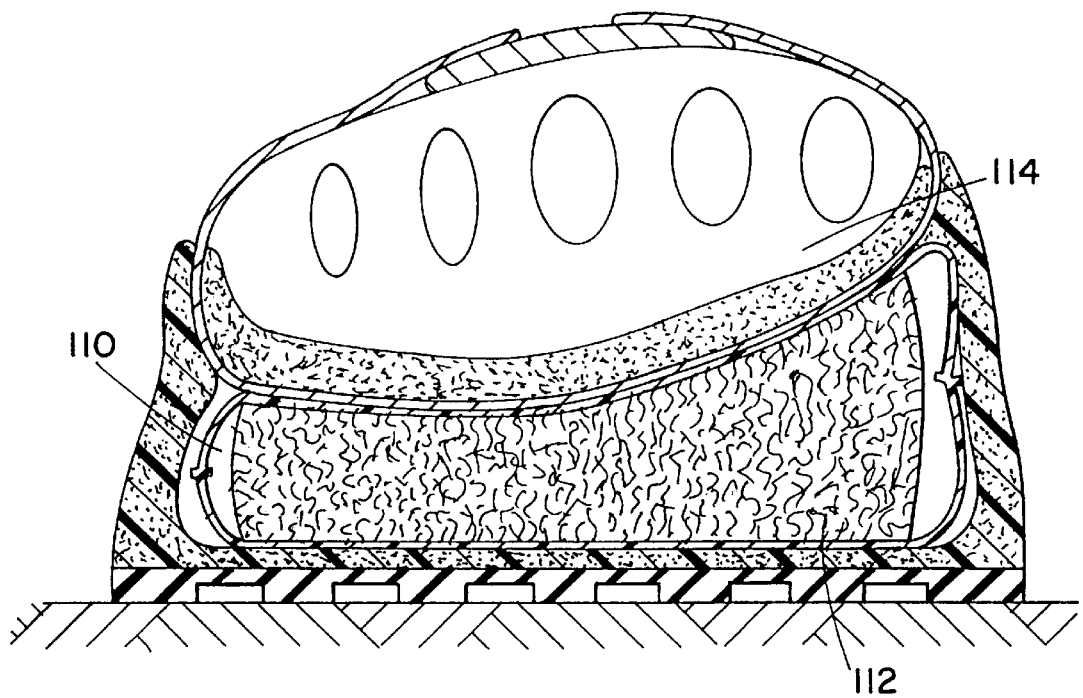
FIG. 6 is a sectional view taken along line 6—6 of the shoe of FIG. 1.

Referring now to FIG. 6, the shock absorbing cushion 110 is constructed to conform to the arch 114 of the foot by making compressible insert 112 thicker in that region 114. Chopped, orientated filaments or roving are shown properly disbursed in the foam. Accordingly, an extremely comfortable and highly efficient cushion is provided.

Figure 8:
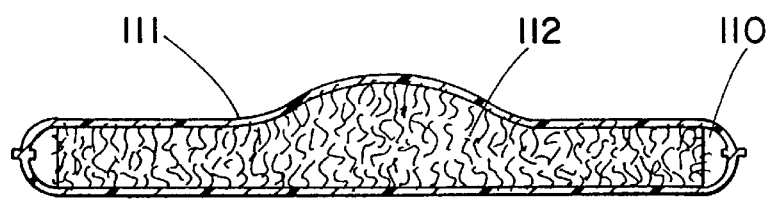
FIG. 8 is cross section taken along line 8—8 of FIG. 7.
Figure 9:
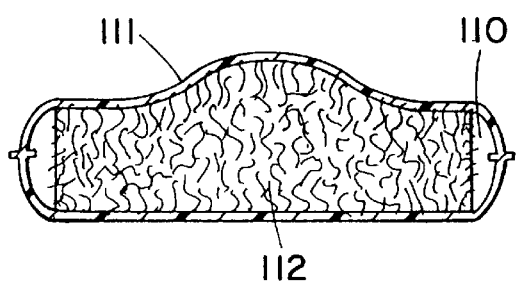
FIG. 9 is a cross-section taken along line 9—9 of FIG. 7.

This tailoring of the surface is readily demonstrated in FIGS. 7–9. Particularly, it can be seen that the cushion 210 includes a raised portion 211 under the arch of the foot, the metatarsal arch of the foot region 213, and the in the center of the heel for extra cushioning at heel strike 214. The sections 8—8 and 9—9 correspond to the figures; 8 (metatarsal arch) and 9 (heel area).

Referring now to FIGS. 4A–4F, which are enlarged for clarity, the excellent cushioning efficiencies of the inventive cushion are demonstrated. FIGS. 4A–F demonstrates the ability of the fluid filled portion of the cushioning insert to provide a comfortable feel, i.e. riding on air—when compressible fluids are utilized— which upon exertion of force provides an exceptional and uniquely beneficial absorbance, distribution, storage, and return of energy. In addition, the compressible insert provides additional cushioned support and assurance against bottoming-out of the device. The filament interface 313 is seen joining compressible insert 312 to elastomeric barrier envelope 311.

Figure 10:
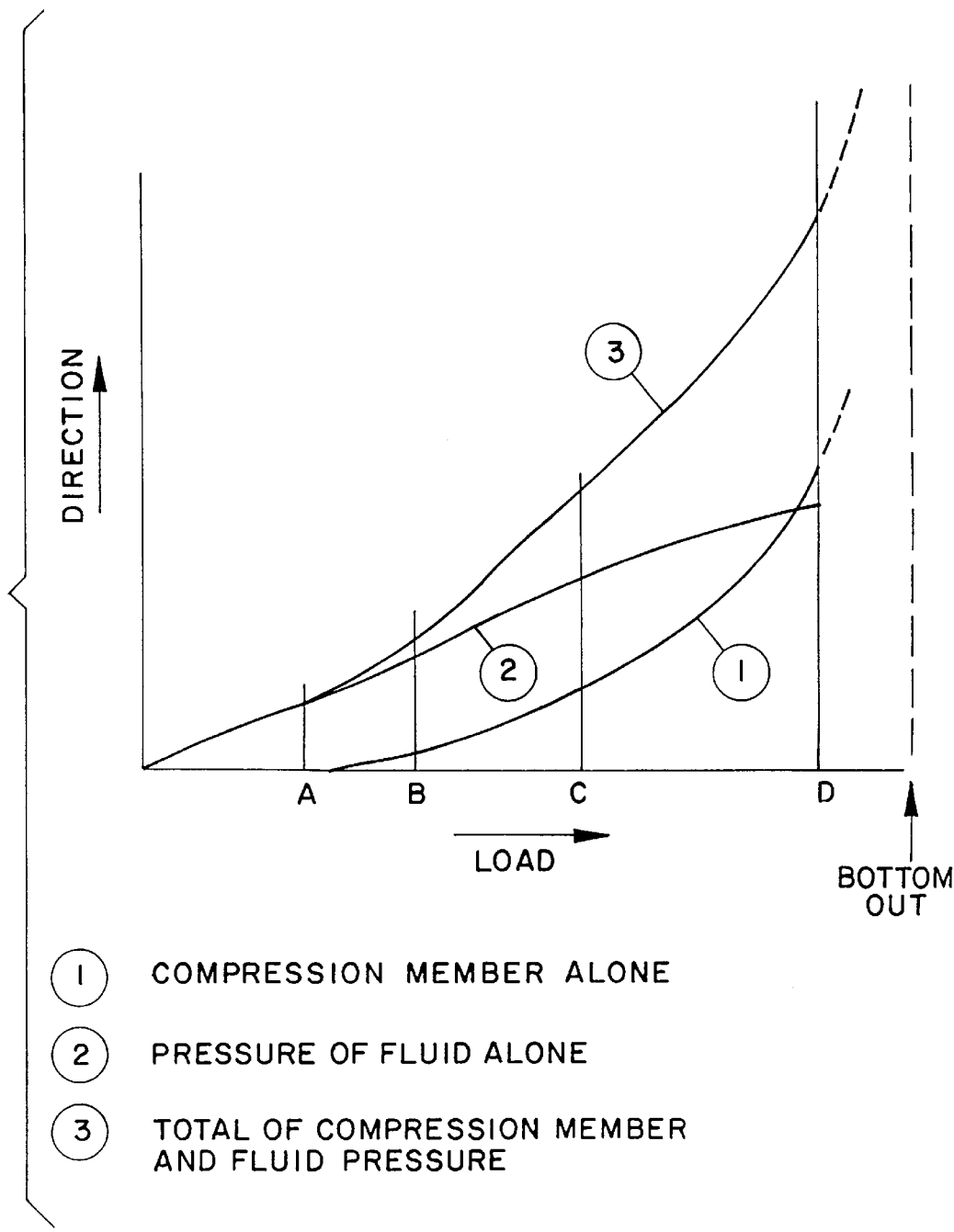
FIG. 10 is a pictorial graph representing the generalized load deflection characteristics of the compression member alone; the support of the contained fluid alone; and the overall combined characteristics of the components working in unison.

In view A, the foot experiences a "riding-on-air" type of support which provides a high degree of comfort. Particularly, the pressure of the fluid supports the foot and there is very little compression of the device. This is depicted in the graph of FIG. 10, where the letters A–D on the abscissa of the graph refer to corresponding FIGS. 4A thru 4D View B demonstrates a moderate amount of compression—for example light running—wherein the elastomeric material 311 and fluid contained therein is compressed; however, the force is not significant enough to significantly deform the compressible insert 312 (see abscissa "B", FIG. 10). In this state, the compression of the fluid absorbs the majority of the force. View C demonstrates hard running—wherein a more severe impact is experienced. It can be seen that in addition to compression of the fluid contained in elastomeric material 311, the compressible insert 312 begins to deform and share in the shock absorbance (abscissa "C", FIG. 10). Referring now to View D, a heavy impact—for example a jump landing— is demonstrated. In this condition, the elastomeric barrier 311 and fluid contained therein and the compressible insert 312 have nearly "bottomed out", i.e. fully compressed. In this condition, the compressible insert member supports and cushions the excess loads that would otherwise bottom out the purely fluid/pneumatic cushioning device (abscissa "D", FIG. 10). Accordingly, a great deal of force has been absorbed and distributed to achieve an extended range and degree of cushioning and durability not available in the prior art. In View E, with the load partially removed, the absorbed force is returned to the foot as elastomeric barrier 311 is forced outward by the pressurized fluid. This action, in combination with the expansion of the compressible insert 312 to its original form during mid-foot and toe-off phases, returns a great deal of the otherwise wasted cushioned heel strike energy to the foot and body and ultimately returns the cushion to its original form (View F).

A variety of methods are envisioned for constructing the device. For example, a woven or nonwoven fabric can be texturized, flannelized or the equivalent, on each side to provide exposed filaments or loops on the surfaces of the fabric. These exposed portions can then be bonded to selected portions of the external surface of the compressible insert. For example, a foam can be chemically or thermally partially cured to achieve a solid center and a tacky, penetrable surface. The texturized fabric, trimmed in advance or after attachment, is layed on and pressed into the penetrable surface. Final curing of the foam embeds the filaments therein, creating a secure bond. The multitude of high tensile strength filaments of the fabric penetrate the surface layers of the compression member and simultaneously overlap and bond to the filaments comprising the surface layer of the compressible insert. Similarly, the filaments internal to the compressible insert are disbursed in an overlapping manner and bond to one another throughout the cross-section. Accordingly, bonding of filament to filament as they overlap one another is achieved, providing the compressible member with excellent tensile and compressive strength and bonding to the elastomeric envelope.

Care should be taken to avoid immersion and saturation of the exposed side of the fabric so as to preserve and maintain exposure of the filaments destined for embedding in, or secured attachment to the elastomeric barrier material. The elastomeric material, in sheets or blow molded or otherwise pre-formed, are placed on the top and bottom surfaces of the fabric coated foam insert and secured to the filaments via flame treatment, ultrasound, I.R., microwave or RF heating or other method common to those skilled in the art, to at least partially melt the surface facing the filaments. Preferably, only the facing surface of the elastomeric sheet is melted to a controlled depth, allowing the exposed filaments to only partially penetrate the elastomeric member and embed therein. Only partial penetration is desired because a filament extending through the entirety of the barrier layer provides a "leak path" for fluid escape and eventual cushion failure.

Thereafter, the elastomeric barrier envelope comprising at least one compression member is sealed at the perimeter, for example by RF welding. A fluid may then be transported into the sealed barrier envelope via activated diffusion, chamber to chamber transport, or injected mechanically by a needle or a valve—item 16 of FIG. 1—to complete the cushion.

Alternatively, the fabric can be replaced with a chopped or woven roving sprayed or otherwise flocked or eletrostatically uniformly disbursed and positioned onto the semicured surface of the compressible insert.

Likewise, the process can be reversed wherein the elastomeric envelope is prepared and a chopped roving or fabric is embedded onto its interior surface. Thereafter, a compressible insert is cured within the elastomeric envelope and allowed to embed the filaments. This method is particularly desirable because chopped filament roving can be readily secured to an elastomeric sheet or blow molded envelope when it is exposed to a heated platen or heated air, respectively. Moreover, the exterior surface will cure first and allow partial filament penetration.

Alternatively, when a compressible insert having filament reinforcement is utilized, the compressible insert can be constructed with filaments which extend beyond the outer walls of the compressible insert. Preferably, the filaments extending from the surface will be trimmed to the desired length to facilitate application of the elastomeric barrier material and embedding therein.

Alternatively, it is envisioned that a filament reinforced compressible insert can be designed with fingerlike or teat-like projections, with or without containing filament reinforcement. When the elastomer barrier material is applied thereto, the fingers and inherently the filaments become embedded in the elastomeric barrier material.

As will be apparent to those skilled in the art, there are a vast array of mechanisms and techniques by which a filament interface between the compressible insert and the flexible barrier envelope can be achieved. The important factor is embedding first and second portions of a sufficient length and quantity of filaments to achieve a peel strength, preferably, at least 5 lbs. per linear inch, more preferably at least 13 lbs. per linear inch. Preferably, there are at least 1000 filaments per square inch in the regions of attachment.

Of course, compressible inserts comprised of woven, twisted, sewn or matted fibers or filaments, for example sewn cotton fiber pads, can simply be texturized to expose the desired amount of filaments which can be embedded in the elastomeric barrier envelope. In this context, the filaments are "embedded" and secured in the compressible insert directly as a result of their woven or matted construction.

Figure 5A:
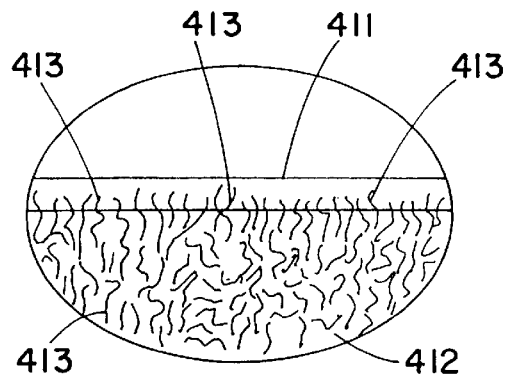
FIGS. 5A–5E are examples of alternative filament interfaces which accomplish the purpose of the invention.
Figure 5B:
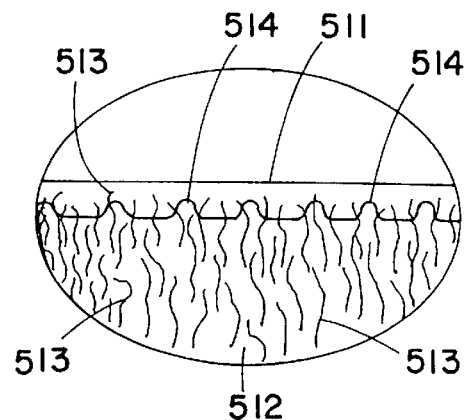
Figure 5C:
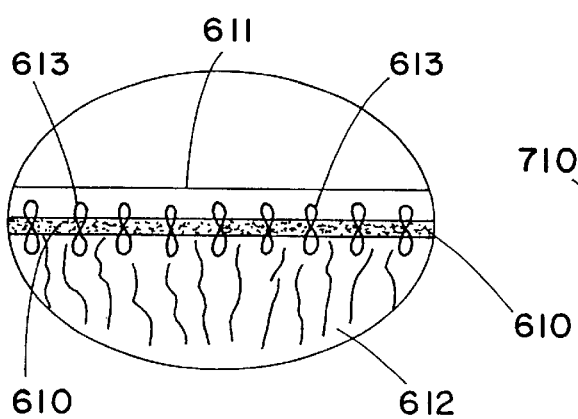
Figure 5D:
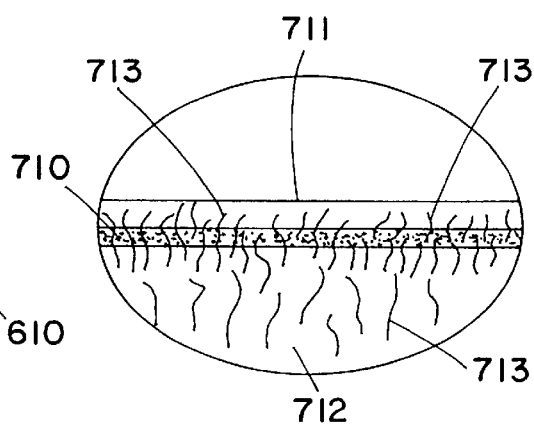
Figure 5E:
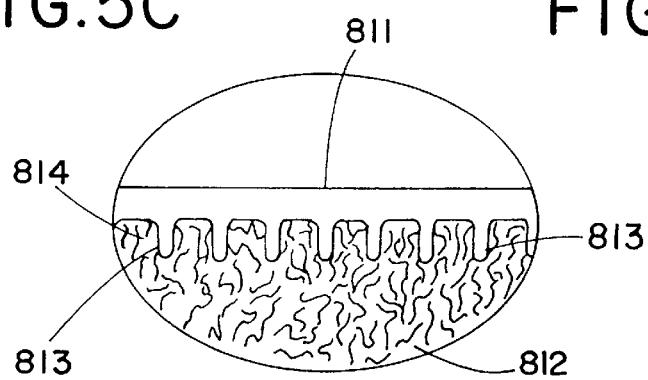

Examples of filament interface techniques, meant to demonstrate but not limit the invention, are provided in FIGS. 3 and 5A–E. In FIG. 3, the exposed ends of reinforcement filaments 13 are embedded in barrier member 11. Referring now to FIG. 5A, a plurality of chopped roving filaments 413 have been embedded in both elastomeric barrier member 411 and in compressible insert 412. In FIG. 5B, compressible insert 512 includes finger like protrusions 514, which contain at least some ends of the reinforcing filaments 513. Since the protrusions 514 are embedded in elastomeric barrier member 511, the filaments 513 become embedded and secured therein as well. In FIGS. 5C and 5D, fabrics are demonstrated as the filament interface material. In FIG. 5C, a fabric 610 having a plurality of loops 613 provides the interface between compressible insert 612 and elastomeric barrier 611. In FIG. 5D, a texturized fabric 710 having a plurality of exposed fibrils or filaments 713 secures elastomeric barrier layer 711 to the compressible insert 712. In FIG. 5E, teat-like protrusions 813 form the internal surface of elastomeric barrier layer 811. These protrusions extend into compressible insert 812, contacting and securing layer 811 to fibers 814.

Finally, it is noted that the filament junction of the compressible insert and elastomeric barrier material can be supplemental with adhesive or a coupling layer attachment.

Thus, it is apparent that there has been provided, in accordance with the invention, a cushioning device for products and objects which encounter impact forces that fully satisfies the objects, aims, and advantages set forth above. While the invention has been described in conjunction with specific embodiments thereof, it is evident that many alternatives, modifications, and variations would be apparent to those skilled in the art in light of the foregoing description. Accordingly, it is intended to embrace all such alternatives, modifications, and variations as fall within the spirit and broad scope of the appended claims.

Having thus described the invention, the following is claimed:

1. A cushioning device comprised of at least one sealed chamber, said sealed chamber being formed of a flexible barrier material, the sealed chamber surrounding a compressible member, said sealed chamber also containing a fluid, said compressible member being secured to said barrier material forming said chamber by a plurality of filaments having a first portion embedded in said barrier material and a second portion embedded in said compressible member.

2. The cushioning device of claim 1 wherein said compressible member is shaped to conform to a human body.

3. The cushioning device of claim 1 having two opposed surfaces, said surfaces being substantially planar or anatomically contoured.

4. The cushioning device of claim 1 wherein said compressible member is comprised of foam.

5. The cushioning device of claim 4 wherein said foam is comprised of urethane.

6. The cushioning device of claim 1 wherein said fluid is compressible.

7. The cushioning device of claim 6 wherein said chamber has a gage pressure equal to or greater than 0.

8. The cushioning device of claim 1 wherein said fluid is incompressible.

9. The cushioning device of claim 6 wherein said fluid is a gas selected from the group consisting of air, nitrogen, hexafluoroethane, sulfur hexafluoride, hexafluoroethane; sulfur hexafluoride; perfluoropropane; perfluorobutane; perfluoropentane; perfluorohexane; perfluoroheptane; octafluorocylcobutane; perfluorocyclobutane; hexafluoropropylene; tetrafluoromethane; monochloropentafluoroethane; 1,2-dichlorotetrafluoroethane; 1,1,2-trichloro-1,2,2-trifluoroethane; chlorotrifluoroethylene; bromotrifluoromethane; monochlorotrifluoromethane; and mixtures thereof.

10. The cushioning device of claim 8 wherein the fluid is selected from the group consisting of water, semi-gel liquids, oil, grease, soft or liquid wax, glycerine, soaps, silicone, corn syrup, rheopexic liquids, thixotropic liquids; and mixtures thereof.

11. The cushioning device of claim 1 wherein said flexible barrier material is comprised of urethane.

12. The cushioning device of claim 1 further comprised of at least 1000 embedded filaments per square inch.

13. The cushioning device of claim 1 wherein said filaments are comprised of a material selected from the group consisting of polyester, polyamide, nylon, fiberglass, carbon, polyethylene terephthalate, silk, cotton, wool, urethane, aramide, dacron, cellulose, rayon, copra, acetate, polyvinyl alcohol, polyacrylic, and mixtures thereof.

14. The cushioning device of claim 1 wherein said filaments have a denier per filament of between about 1 and 20 and a tensile strength of from about 2 to 10 grams per denier.

15. The cushioning device of claim 1 having a separation strength of said barrier material from said compressible member of between about 5 to 40 pounds per linear inch.

16. The cushioning device of claim 1 further comprising an adhesive securing said compressible member to said barrier material.

17. The cushioning device of claim 1 further comprising a coupling layer disposed between said compressible member and said barrier material.

* * * * *